Patented June 26, 1945

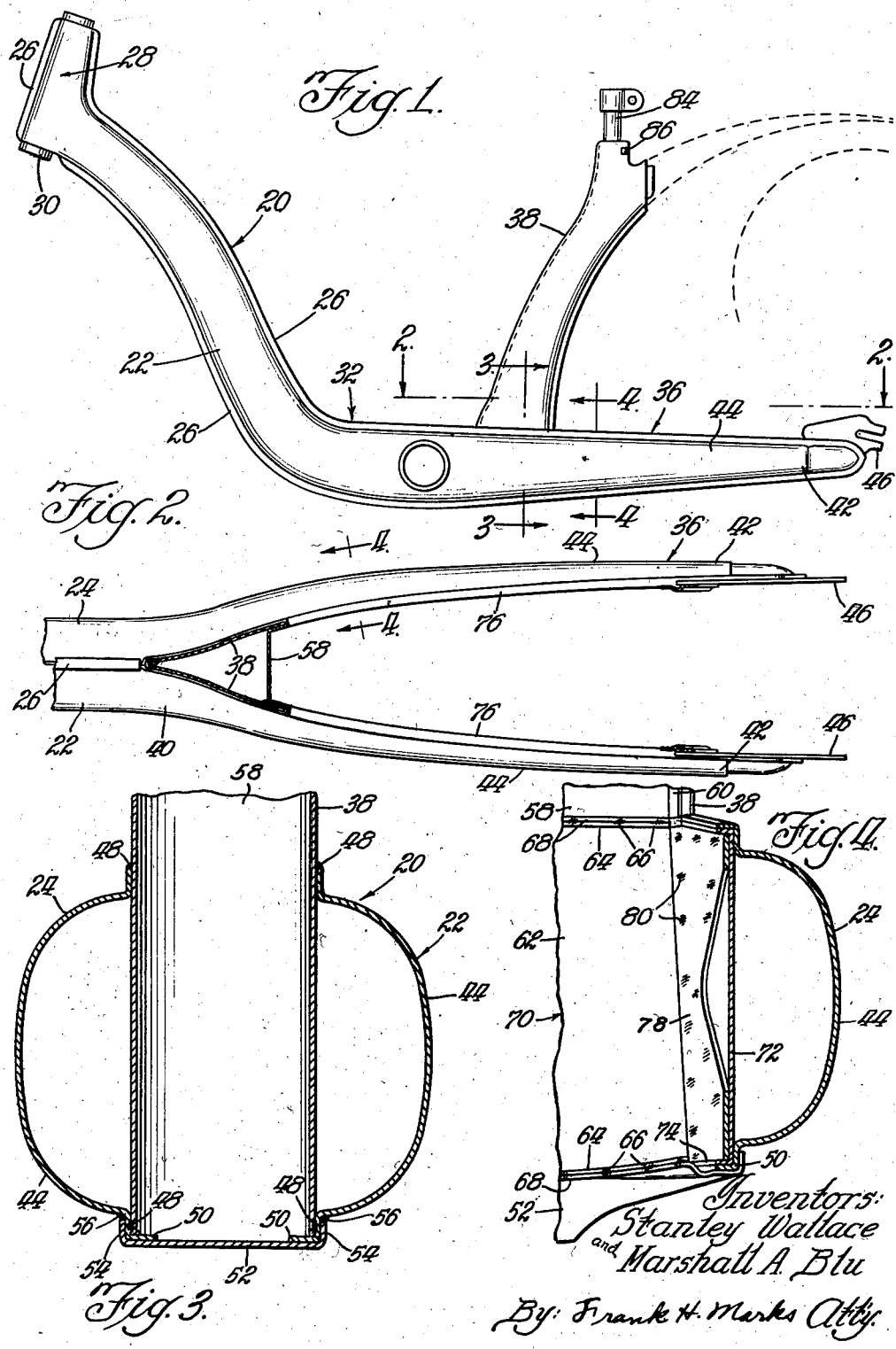

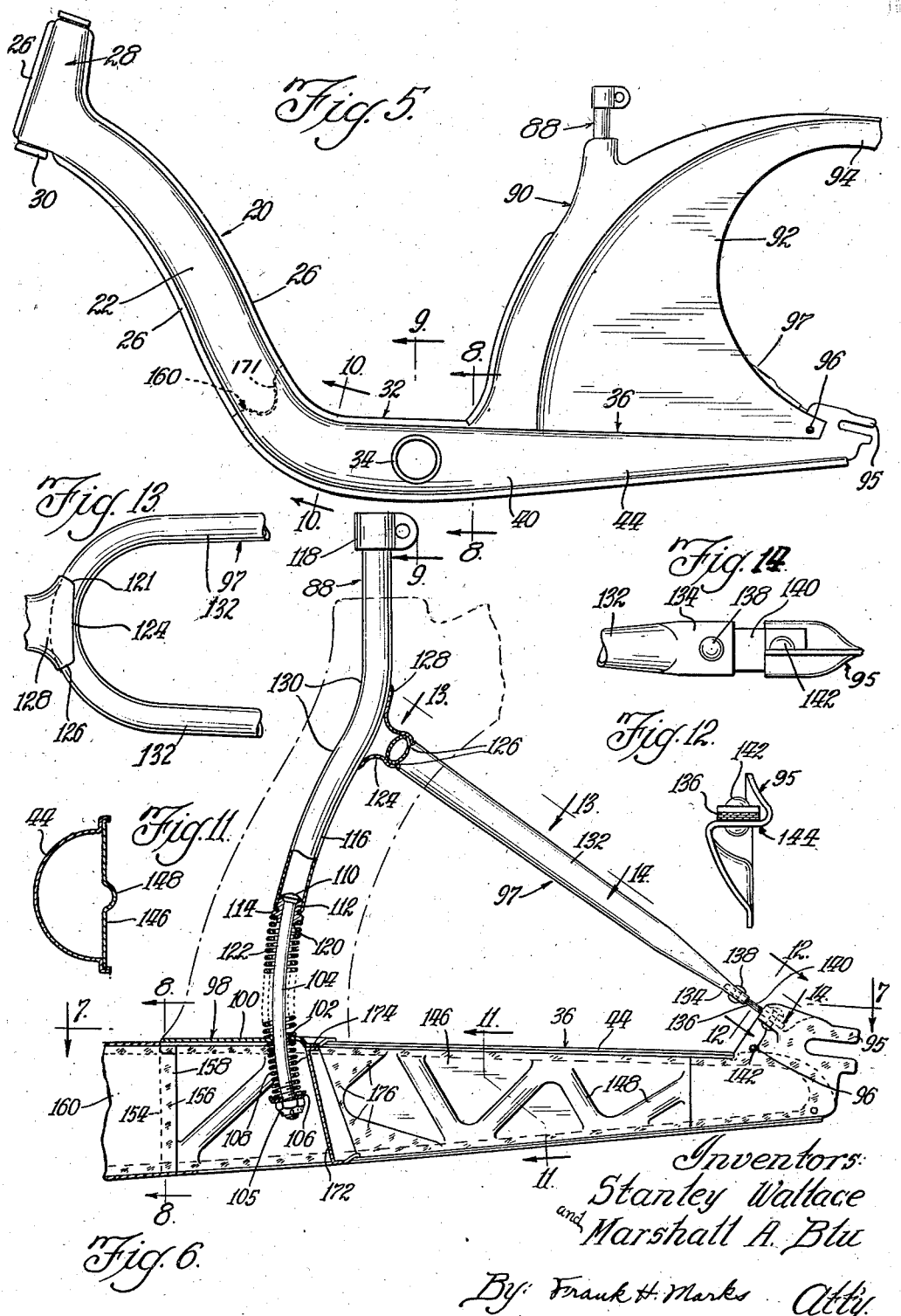

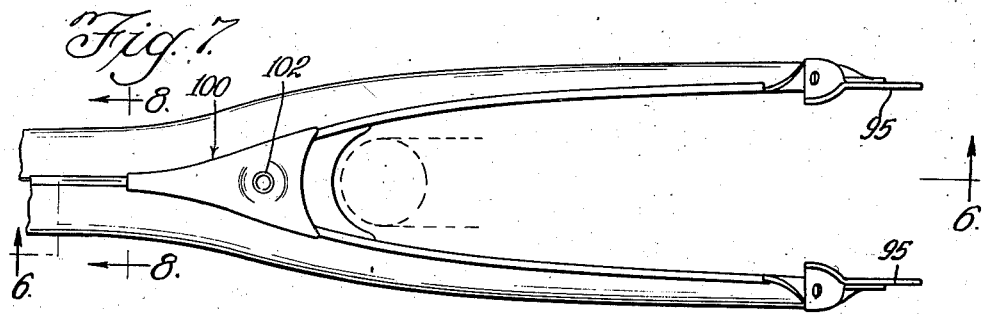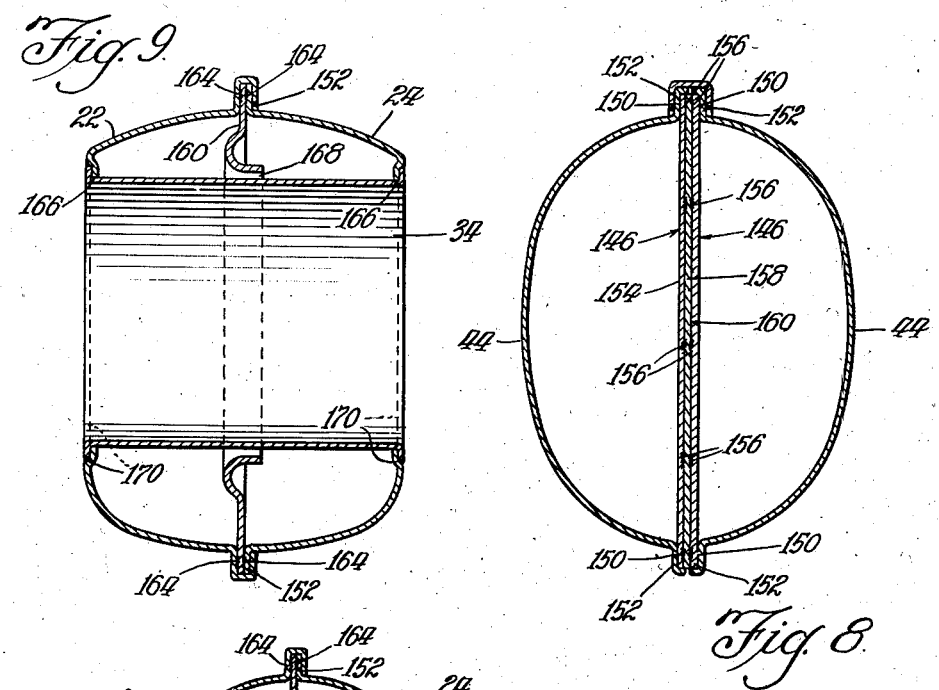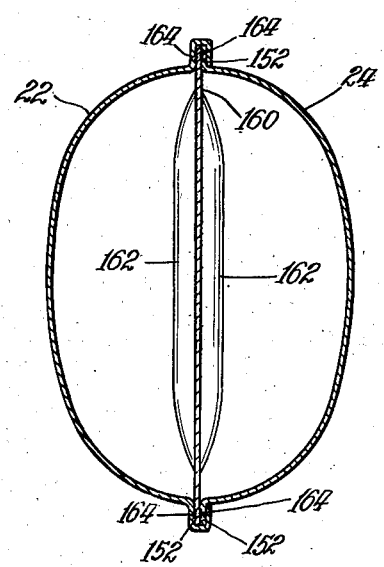

2,378,961

UNITED STATES PATENT OFFICE 2,378,961

BICYCLE CONSTRUCTION

Stanley Wallace, Chicago, and Marshall A. Blu, Riverside, Ill., assignors to Sears, Roebuck and Co., Chicago, Ill., a corporation of New York Application May 19, 1941, Serial No. 394,062

3 Claims. (Cl. 280—281)

This invention relates to cycle construction and is concerned more particularly with the framework and riding qualities of bicycles and the like.

It is an object of our invention to provide a stamped frame of trim appearance and having strength varying therealong with the distribution of load.

Another object is to provide a frame which may be readily reinforced wherever desired and in which the reinforcement is substantially concealed.

A further object involves the provision of a bicycle rear fork reinforced at its bight.

A still further object resides in the provision of a stamped seat mast affording maximum strength with relatively light gage metal.

An additional object is to provide a cushioned saddle support.

Still another object is to provide a load-carrying skirt guard so as to eliminate the need for a conventional seat mast.

It is a further object to provide a skirt guard formed to conceal the seat mast.

Further objects and advantages of the invention will appear as the description proceeds.

The invention will be better understood upon reference to the following description and accompanying drawings, in which:

Fig. 1 is a side elevation of a frame embodying features of our invention.

Fig. 2 is an enlarged sectinal view taken as indicated by the line 2—2 in Fig. 1.

Fig. 3 is an enlarged fragmentary sectional view taken as indicated by the line 3—3 in Fig. 1.

Fig. 4 is an enlarged fragmentary sectional view taken as indicated by the line 4—4 in Figs. 1 and 2.

Fig. 5 is a fragmentary side elevation of another form of our invention.

Fig. 6 is a fragmentary section-elevation of a form of our invention, such as that shown in Fig. 5, taken as indicated by the line 6—6 in Fig. 7.

Fig. 7 is a fragmentary plan view taken substantially as indicated by the line 7—7 in Fig. 6.

Fig. 8 is an enlarged sectional view taken as indicated by the line 8—8 in Figs. 5 and 7.

Figs. 9 and 10 are enlarged sectional views taken, respectively, as indicated by the lines 9—9 and 10—10 in Fig. 5.

Fig. 11 is a sectional view taken as indicated by the line 11—11 in Fig. 6.

Fig. 12 is a sectional view taken as indicated by the line 12—12 in Fig. 6.

Fig. 13 is a fragmentary plan view taken as indicated by the line 13—13 in Fig. 6.

Fig. 14 is a fragmentary plan view taken as indicated by the line 14—14 in Fig. 6.

Referring now more particularly to the drawings, we have shown at 20 (Fig. 1) a frame for bicycles and the like. The frame is illustrated as adapted for a girl's bicycle but it is to be understood that frames involving the principles of the invention may be adapted for boys' bicycles as well. The frame comprises complemental stamped shell sections 22 and 24 seamed together as at 26 into a rigid and for all practical purposes an integral unit affording at the front end 28 thereof a support for a steering post sleeve 30, at an intermediate portion 32 thereof a support for a bearing sleeve 34 for a pedal crank (not shown) and at the rear portion thereof a fork 36. A seat mast 38 is joined to the bight 40 of the fork, and the rear ends 42 of the fork arms 44 carry rear axle hangers 46, which may be secured in place as by welding.

In the form shown in Figs. 1 to 4, the seat mast 38 is a structural member built to withstand riding loads without bracing or any other assistance, and is suitably fitted in the crotch or bight of the fork 36 and welded in place as at 48 to the lips of the frame members 22 and 24. The mast 38 seats on inwardly extending bottom flanges or lips 50 on the members 22 and 24, and a bottom gusset plate 52 substantially closes the lower end of the mast 38 and is preferably provided with upwardly extending flanges 54 welded as at 56 to the parts 22 and 24.

The mast 38 is preferably V-shaped in cross-section, with its open side facing the rear. The open side, above the fork 36, is closed by a bridging plate 58 having flanges 60 welded or otherwise suitably joined to the inner faces of the sides of the mast 38. The open side of the seat mast between the frame fork arms 44 is preferably closed as by means of a plate 62 having preferably upper and lower flanges 64 welded as at 66 to cooperating flanges 68 formed respectively on the bottom of the plate 58 and on the gusset plate 52. The plate 62 may form the bight of a U-shaped reinforcing member 70 whose arms 72 are preferably flanged as at 74 and nested in and welded to upper angular lips 76 and the lower lips 50 formed on the fork portions 44 of the frame.

The arms 72 may be further reinforced by plates 78 welded thereto as at 80. The plates 78 may be integral extensions of the bridging plate 58.

With this construction it is manifest that the seat mast may be regarded as an integral part of an augmented frame and that the mast and fork of the frame are suitably reinforced to perform their functions.

A skirt guard may be suitably mounted on the seat mast 38 and a hanger 46, as may be gathered from the showing of the skirt guard and shroud in Fig. 5, to be described presently.

The seat mast 38 is provided with a suitable socket in its upper end for the reception of a saddle carrier 84 adjustably secured as by a screw 86.

In the modified form of the invention shown in Fig. 5, the parts identical with those in Fig. 1 are similarly numbered. In this modified construction, instead of providing an ornamental seat mast so formed that a skirt guard may be readily attached thereto, we may provide a conventional or other seat mast 88 which may extend downwardly to and be united with the frame 20, at least a major portion of the mast, below the top thereof, being preferably encased in a shroud 90 which preferably is of relatively thin metal not adapted to withstand any substantial load. The shroud may have an extension 92 serving as a skirt guard, and a further extension 94 may be provided to serve as a mud guard. The skirt guard 92 may be suitably attached, as by a pin-and-slot connection 96, to the hanger 46, and a reinforcing brace 97, hereinafter more fully described, may be attached to the seat mast and hanger.

Fig. 6 shows a structure like that of Fig. 5 but with the seat mast shroud in dash-dot lines and certain of the structural details not revealed in Fig. 5. It will accordingly be observed that the crotch 98 of the fork 36 is covered by a gusset 100 which may be welded or otherwise suitably joined to the sides or arms 44 of the fork. The gusset 100 has an opening flanged at 102 and in which is received a curved rod or bar 104, the lower end of said bar being threaded and receiving a nut 105 and a cup washer 106 between which and the lower side of the gusset 100 a coil spring 108 is located. The rod 104 projects upwardly through the flange 102 and has a head 110 below which a sleeve 112 having an outwardly projecting flange 114 is fitted. The flange is welded or otherwise suitably united with the lower end of a tube 116, the upper end of which affords means 118 for attaching a saddle. The sleeve 112 has a downwardly extending circular flange 120 which engages in the upper end of a coil spring 122 about the upper portion of the rod 104, the flange 102 projecting within the lower end of the same spring.

The seat mast generally indicated at 88 is suitably reinforced by the brace 97 which is preferably in the form of a tubular fork having its bight brazed as at 124 or otherwise suitably united to a bracket 128 welded or brazed as at 130 or otherwise suitably mounted on the tube 116. The arms 132 of the brace fork 97 have flattened sockets 134 in which leaf springs 136 are anchored by rivets 138 or other suitable means. The springs 136 extend rearward free of the arms 132 as at 140 and are riveted as at 142 or otherwise suitably anchored to ledges or shelves 144 formed on the hangers 95. The rod 104 and lower part of the tube 116 are preferably curved on an arc having its center at the flexing portion 140 of the springs, so that the up-and-down movement of the seat mast may be substantially unobstructed except by the resistance offered by the various springs 108, 122 and 136.

This construction accordingly affords a resilient seat mast.

The frame fork arms 44 are reinforced as in Figs. 1 to 4 by webs or plates 146 preferably strengthened by embossed portions 148, enabling lighter plates to be used, the plates being marginally spot-welded as at 150 or otherwise suitably joined to the lip portions 152 on said arms. The plates terminate forwardly at 154 adjacent the forward end of the frame fork 36, where they are spot-welded as at 156 or otherwise suitably joined to opposite sides of the rear end 158 of a preferably stronger similar reinforcing web or plate 160 having weight-reducing reinforcing ribs or embossing 162 (Fig. 10). The plate 160 is welded as at 164 or otherwise suitably joined to the upper and lower seam lips 152 of the frame bars 22 and 24.

The frame bars 22 and 24 and plate 160 have substantially alined openings 166 (Fig. 9) accommodating a foot pedal sleeve journal 34 having outwardly projecting flanges nested in and brazed as at 170 or otherwise suitably anchored to the bars. The plate 160 may extend forwardly throughout the length of the frame, but preferably terminates as at 171 so as to extend throughout the frame portion taking the major part of the load stresses, the frame and plate 160 being varied longitudinally in strength to withstand all stresses with minimum weight.

The gusset 100 is reinforced by a cross web 172 welded thereto as at 174 and also welded as at 176 to and bridging the fork webs 146.

It is apparent from the foregoing that we have provided a built-up frame which may be formed of relatively light stamped metal members capable of quick assembly into a rugged structure, affording adequate reinforcement commensurate with the loads to be withstood at various points, together with alternative seat post constructions, one being of a yieldable character adapted to be concealed by a shroud which may be secured to the frame, the other also having the ornamental advantages of a shroud.

Various modifications may suggest themselves to those skilled in the art without departing from the spirit of our invention and, hence, we do not wish to be restricted to the specific form shown or uses mentioned, except to the extent indicated in the appended claims, which are to be interpreted as broadly as the state of the art will permit.

We claim:

1. A bicycle frame construction comprising connected complemental frame shell members extending substantially from the rear axle to the steering post, the rear portions thereof constituting a fork, and connected upstanding complemental shell members joined at the lower portions thereof to the bottom and top portions of the aforesaid shell members at and reinforcing the bight of the fork and extending upward therefrom, forming a seat mast.

2. A bicycle frame construction comprising connected complemental frame shell members extending substantially from the rear axle to the steering post, the rear portions thereof constituting a fork, connected upstanding complemental shell members joined at the lower portions thereof to the bottom and top portions of the aforesaid shell members at and reinforcing the bight of the fork and extending upward therefrom, forming a seat mast, a reinforcing web joined to and between said frame shell members forwardly of said bight, said frame shell members and web having substantially alined transverse openings, and a pedal journalling sleeve disposed in said openings and united to said frame shell members, said reinforcing web being joined to said seat mast shell members.

3. A bicycle frame construction comprising connected complemental frame shell members extending substantially from the rear axle to the steering post, the rear portions thereof constituting a fork, a pair of connected upstanding complemental shell members within the bight of said fork, the lower portions of said upstanding members being joined to the bottom and top portions of said frame shell members whereby the bight of said fork is reinforced, said upstanding members extending upward from said fork and being joined together substantially at the center of said bight and diverging rearwardly, and means bridging the rear portions of said upstanding members whereby to form therewith a substantially rigid seat mast.

STANLEY WALLACE.
MARSHALL A. BLU.